US012590242B1

(12) United States Patent
Nevilles et al.

(10) Patent No.: US 12,590,242 B1
(45) Date of Patent: Mar. 31, 2026

(54) WELL TREATMENT COMPOSITIONS AND METHODS OF MAKING AND USING SAME

(71) Applicant: NIGHTHAWK COMPLETION SERVICES, LLC, Spring, TX (US)

(72) Inventors: Christopher Cody Nevilles, Sping, TX (US); Marcos Antonio Martinez, Spring, TX (US); Danielle Baldwin, Spring, TX (US)

( * ) Notice: Subject to any disclaimer, the term of this patent is extended or adjusted under 35 U.S.C. 154(b) by 0 days.

(21) Appl. No.: 18/628,135

(22) Filed: Apr. 5, 2024

Related U.S. Application Data

(60) Provisional application No. 63/457,246, filed on Apr. 5, 2023.

(51) Int. Cl.
| | |
|---|---|
| *C09K 8/82* | (2006.01) |
| *C09K 8/60* | (2006.01) |
| *E21B 33/138* | (2006.01) |
| *E21B 43/16* | (2006.01) |
| *E21B 49/08* | (2006.01) |

(52) U.S. Cl.
CPC ............... *C09K 8/602* (2013.01); *C09K 8/82* (2013.01); *E21B 33/138* (2013.01); *E21B 43/16* (2013.01); *E21B 49/08* (2013.01)

(58) Field of Classification Search
None
See application file for complete search history.

(56) References Cited

U.S. PATENT DOCUMENTS

| | | | |
|---|---|---|---|
| 5,591,701 A | 1/1997 | Thomas | |
| 5,881,826 A | 3/1999 | Brookey | |

| | | | | |
|---|---|---|---|---|
| 6,148,917 A | * | 11/2000 | Brookey | ............... E21B 31/035 175/69 |
| 6,156,708 A | * | 12/2000 | Brookey | ................ E21B 21/00 166/309 |
| 6,302,209 B1 | | 10/2001 | Thompson, Sr. et al. | |
| 7,566,686 B2 | | 7/2009 | Kippie et al. | |

(Continued)

OTHER PUBLICATIONS

Foxenberg et al., Eliminate Formation Damage Caused By High Density Completion Fluid—Crude Oil Emulsion, SPE Formation Damage Control Conference, Feb. 18, 1998.

(Continued)

*Primary Examiner* — Andrew Sue-Ako
(74) *Attorney, Agent, or Firm* — Kean Miller LLP; Robert Devin Ricci; Taylor Dunne

(57) ABSTRACT

Disclosed herein are well treatment compositions and methods. In a specific embodiment, a well treatment compositions includes a surfactant composition that includes: one or more surfactants, where the one or more surfactants includes: sodium alpha olefin sulfonate, cocamidopropyl hydroxysultaine, and mixtures thereof, where the one or more surfactants are present, and where the surfactant composition has a content of the one or more surfactants from about 0.1%/wt. to about 50.0%/wt.; and one or more carrier media, where the one or more carrier media are present, and where the surfactant composition has a content of the one or more carrier media from about 50.0%/wt. to about 99.9%/wt., where the surfactant composition as a hydrophilic-lipophilic balance of about 11.0 to about 14.0; and where the surfactant composition has a surface tension from about 25 dynes/centimeter to about 35 dynes/centimeter.

9 Claims, 5 Drawing Sheets

(56)                     References Cited

U.S. PATENT DOCUMENTS

| | | | |
|---|---|---|---|
| 8,517,100 | B2 | 8/2013 | Ali et al. |
| 9,045,675 | B2 | 6/2015 | Mason et al. |
| 9,611,416 | B2 | 4/2017 | Wang et al. |
| 10,053,615 | B2 | 8/2018 | Offenbacher et al. |
| 10,227,524 | B2 | 3/2019 | Tellez et al. |
| 10,995,257 | B2 | 5/2021 | De Wolf et al. |
| 11,124,695 | B2 | 9/2021 | Mahmoud et al. |
| 11,542,817 | B1 * | 1/2023 | McGraw ............. E21B 49/0875 |
| 2004/0171497 | A1 * | 9/2004 | Growcock ............... C09K 8/36 |
| | | | 507/100 |
| 2005/0124738 | A1 | 6/2005 | Sivik et al. |
| 2013/0137609 | A1 * | 5/2013 | Pierce ...................... C09K 8/70 |
| | | | 507/202 |
| 2016/0177164 | A1 | 6/2016 | Dillon et al. |
| 2018/0346789 | A1 | 12/2018 | Ali et al. |
| 2023/0167351 | A1 * | 6/2023 | Schultz .................. C09K 8/501 |
| | | | 507/204 |

OTHER PUBLICATIONS

Nareh'ei et al., Rheological and Filtration Loss Characteristics of Colloidal Gas Aphron Based Drilling Fluids, Journal of the Japan Petroleum Institute, 2012.

Ehsan et al., Rheological properties of Aphron based drilling fluids, Petroleum Exploration and Development, 2016.
Tabzar et al., Rheology, Stability and Filtration Characteristics of Colloidal Gas Aphron Fluids: Role of Surfactant and Polymer Type, Journal of Natural Gas Science and Engine.
Spinelli et al., Synthetic-based aphrons: Correlation between properties and filtrate reduction performance, Colloids and Surfaces A: Physicochem. Eng. Aspects, 2010.
Gaurina-Medimurec et al., Aphron-Based Drilling Fluids: Solution for Low Pressure Reservoirs, University of Zagreb, Faculty of Mining, Geology and Petroleum Engineering, 2009.
Heidari et al., Experimental study of rheological properties of aphron based drilling fluids and their effects on formation damage, Sharif University of Technology, 2017.
Qiu et al., Chemical Additives for Improving Compatibility of Drilling Fluid, Completion Fluid, and Other Well-Treatment Fluids for Deepwater Wells, SPE International Symposiu, Apr. 2011.
Ahmadi et al.,Colloidal gas aphron drilling fluid properties generated by natural surfactants: Experimental investigation, Journal of Natural Gas Science and Engineering, 2015.
Tabibzadeh et al., Experimental Study of Polymer and Surfactant Concentration Effect on Yield and Stability of Aphron Fluids, 2015.
Growcock et al., Alternative Aphron-Based Drilling Fluid, Mar. 2, 2004.

* cited by examiner

Table 1: Inventive Surfactant Compositions

Percent by weight (%/wt)

| Components | CAS# | Ionic State | HLB | Comp #1 | Comp #2 | Comp #3 | Comp #4 | Comp #5 | Comp #6 | Comp #7 | Comp #8 | Comp #9 | Comp #10 | Comp #11 | Comp #12 | Booster |
|---|---|---|---|---|---|---|---|---|---|---|---|---|---|---|---|---|
| water | 7732-18-5 | | | 88.67 | 91.00 | 84.50 | 79.60 | 53.25 | 80.67 | 84.50 | 89.20 | 88.30 | 91.20 | 83.10 | 83.60 | 94.60 |
| nonylphenol ethoxylated (C13 / 9 moles EO) | 127087-87-0 | nonionic | 12.9 | 10.00 | | 8.40 | | | | 8.40 | 4.00 | 4.00 | | 2.50 | 1.00 | |
| ethoxylated alcohol, trideceth-9 (6 - 10 moles EO) | 9043-30-5 | nonionic | 10.0 - 14.0 | | | | | | 10.00 | | | | | | | |
| sodium alpha olefin sulfonate (C12-C16) | 68965-65-6 | anionic | | 0.50 | 6.75 | 2.00 | 4.50 | 6.75 | 0.50 | 2.00 | 2.00 | 2.00 | 2.00 | 2.00 | 2.00 | 4.50 |
| 1-Dodecanesulfonic acid, hydroxy-, sodium salt | 128824-30-6 | anionic | | 0.50 | | | | | 0.50 | | | | | | | |
| lauramine oxide (C12) | 1643-20-5 | amphoteric | | 1.20 | | 1.20 | | | 1.20 | 1.20 | | | | | | |
| sodium lauryl ether sulfate (2 moles EO) | 68585-34-2 | anionic | | 1.50 | | 1.50 | | | 1.50 | 1.50 | | | | | | |
| sodium lauryl sulfate | 151-21-3 | anionic | | 1.50 | | 1.50 | | | 1.50 | 1.50 | | | | | | |
| cocamidopropyl hydroxysultaine (C12) | 68139-30-0 | anionic | | 0.90 | 2.25 | 0.90 | 0.90 | | 0.90 | 0.90 | 0.90 | 0.90 | 0.90 | 0.90 | 0.90 | 0.90 |
| n-octadecyl disodium sulfosuccinate | 14481-60-8 | anionic | | | | | | | | | 1.50 | 1.00 | | | 2.00 | |
| Dioctyl Sodium Sulfosuccinate | 577-11-7 | anionic | | | | | | | | | 1.50 | 1.00 | | | 2.00 | |
| Cocamidopropyl Betaine | 61789-40-0 | zwitterionic | | | | | | | | | 0.90 | 0.90 | 0.90 | 2.00 | | |
| Coco Glucoside (C8-C14) | 141464-42-8 | nonionic | 12.0 - 14.0 | | | | | | | | | | 1.00 | | | |
| Decyl Glucoside (C8-C10) | 54549-25-6 | nonionic | 13.0 - 15.0 | | | | | | | | | 1.00 | | | | |
| glyceryl laurate | 27215-38-4 | nonionic | 5.2 | | | | | | | | 1.00 | | | | | |
| cocamidopropylamine oxide | 68155-09-9 | amphoteric | | | | | | | | | 1.00 | 1.00 | | 2.00 | 3.00 | |

FIGURE 2

| | | | | | | | | | | | | |
|---|---|---|---|---|---|---|---|---|---|---|---|---|
| calcium dodecylbenzenesulphonate | 26264-06-2 | anionic | | | | | | | | 1.00 | 0.50 | |
| sodium cocoate | 61789-31-9 | anionic | | | | | | | | 2.00 | | |
| lauramidopropyl hydroxysultaine | 10223-55-1 | amphoteric | | | | | | 0.90 | 1.00 | | | |
| cocamide diethanolamine | 68603-42-9 | nonionic | 10.0–15.0 | | | | | | 1.00 | 1.00 | | |
| dodecyldimethylamine oxide | 1643-20-5 | amphoteric | | | | | | | | | 1.50 | 1.00 |
| polyoxyethylene 20 sorbitan trioleate (20 moles EO) | 9005-70-3 | nonionic | 11.0 | | | | | | | | 1.00 | |
| sorbitan monolaurate (20 moles EO) | 9005-64-5 | nonionic | 16.7 | | | | | | | | | 1.00 |
| 2-propanol | 67-63-0 | | | 3.23 | 5.00 | 5.00 | 3.23 | | | | | 3.00 |
| methanol | 67-56-1 | | | | 5.00 | 10.00 | | | | | | 5.00 |
| 2-butoxyethanol | 111-76-2 | | | | 5.00 | 25.00 | | | | | | |
| | | | Total | 100.00 | 100.00 | 100.00 | 100.00 | 100.00 | 100.00 | 100.00 | 100.00 | 100.00 |

FIGURE 2
(continued)

Table 4: Inventive Gelling Compositions

| Components | CAS# | Physical State | Comp #1 | Comp #2 | Comp #3 | Comp #4 | Comp #5 | Comp #6 | Comp #7 | Comp #8 | Comp #9 | Comp #10 | Comp #11 | Comp #12 |
|---|---|---|---|---|---|---|---|---|---|---|---|---|---|---|
| | | | Percent by weight (%/wt) | | | | | | | | | | | |
| distillates, hydrotreated light naphthenic | 64742-53-6 | Liquid | 25.64 | 51.27 | | | 51.46 | 51.47 | | 51.47 | | 49.28 | 48.95 | 51.46 |
| distillates, petroleum, hydrotreated light paraffinic | 64742-47-8 | Liquid | | | 51.27 | | | | | | | | | |
| distillates, petroleum, hydrotreated light paraffinic | 64742-55-8 | Liquid | | | | | | | 50.23 | | 51.47 | | | |
| solvent dewaxed heavy paraffinic distillate | 64742-65-0 | Liquid | 25.63 | | | | | | | | | | | |
| mineral oil | 8042-47-5 | Liquid | | | | 51.27 | | | | | | | | |
| Alkyl quaternary ammonium bentonite organophilic phyllosilicate | 68953-58-2 | Powder | 2.40 | 2.40 | 1.20 | 1.20 | 2.40 | 2.40 | 2.40 | 2.40 | 2.40 | 2.26 | 2.30 | 2.40 |
| sodium-montmorillonite bentonite clay | 1302-78-9 | Powder | | | 1.20 | 1.20 | | | | | | | | |
| propylene carbonate | 108-32-7 | Liquid | 0.83 | 0.83 | 0.83 | 0.83 | 0.83 | 0.83 | 0.83 | 0.83 | 0.83 | 0.79 | 0.79 | 0.83 |

FIGURE 3

| Component | CAS | Form | | | | | | | | | | | | |
|---|---|---|---|---|---|---|---|---|---|---|---|---|---|---|
| nonylphenol ethoxylated | 127087-87-0 | Liquid | 2.50 | | | | | 2.50 | 2.50 | 2.50 | | | 2.50 | |
| ethoxylated alcohol, trideceth-9 | 9043-30-5 | Liquid | | 2.38 | 2.39 | | | | | | 1.25 | 2.50 | | 2.50 |
| ethylene oxide/propylene oxide copolymer | 9003-11-6 | Liquid | | | | 2.50 | 2.50 | | | | 1.25 | | | |
| sodium carboxymethyl cellulose (CMC) | 9000-11-7 | Powder | 2.50 | 4.60 | 4.53 | 19.30 | 14.20 | 9.13 | 19.30 | 5.00 | 43.00 | 43.00 | 43.00 | 43.00 |
| xanthan gum | 11138-66-2 | Powder | 17.05 | 18.41 | 40.75 | 14.50 | 18.40 | 13.89 | 9.00 | 17.05 | | | | |
| guar gum | 9000-30-0 | Powder | 2.50 | 8.77 | | | | 16.17 | 14.50 | 7.95 | | | | |
| polyanionic cellulose (PAC) | 9004-32-4 | Powder | 12.81 | 13.80 | | 9.00 | 9.70 | 4.87 | | 12.81 | | | | |
| hydroxyethyl cellulose (HEC) | 9004-62-0 | Powder | 7.95 | | | | | | | | | | | |
| Total | | | 100.0 | 100.0 | 100.0 | 100.0 | 100.0 | 100.0 | 100.0 | 100.0 | 100.0 | 100.0 | 100.0 | 100.0 |

FIGURE 3
(continued)

WELL TREATMENT COMPOSITIONS AND METHODS OF MAKING AND USING SAME

CROSS-REFERENCE TO RELATED APPLICATIONS

This application claims benefit of priority under 35 U.S.C. § 119(e) of U.S. Ser. No. 63/457,246, filed Apr. 5, 2023, the entire contents of which is incorporated herein by reference in its entirety.

BACKGROUND

Field

Well treatment compositions and methods for using them to treat oil and gas wells are described.

Description of the Related Art

The application of lightweight well treatment fluids can be important for developing oil and gas wells. For example, in hydraulic fracturing, fluids are injected under high pressure through perforations in a casing disposed within a wellbore. The high pressure creates fractures in the subterranean formation to stimulate hydrocarbon flow from the formation into the wellbore and up to the surface. However, when the pressure of hydrocarbons within the subterranean formation is low, it can be difficult to have sufficient fluid circulation within the casing of the wellbore. In response, lightweight fluids have been created by mixing-in air or nitrogen to lower the density of the fluid so sufficient fluid circulation can be obtained. However, these lightweight well treatment fluids can have drawbacks. For example, the bubbles in the lightweight well treatment fluids can have poor stability. In fact, it can be challenging to find a proper balance of surfactants to provide effective bubble stability for certain downhole applications.

Consequently, there is a need for new well treatment compositions that have effective bubble stability, allowing for adequate fluid circulation and preventing damage to the subterranean formations.

SUMMARY

Provided herein are well treatment compositions and methods for using them to treat subterranean formations for hydrocarbon production. In a specific embodiment, a well treatment compositions includes a surfactant composition that includes: one or more surfactants, where the one or more surfactants include: sodium alpha olefin sulfonate, cocamidopropyl hydroxysultaine, and mixtures thereof, where the one or more surfactants are present, and where the surfactant composition has a content of the one or more surfactants from about 0.1%/wt to about 50.0%/wt; and one or more carrier media, where the one or more carrier media are present, and where the surfactant composition has a content of the one or more carrier media from about 50.0%/wt to about 99.9%/wt, where the surfactant composition as a hydrophilic-lipophilic balance of about 11.0 to about 14.0; and where the surfactant composition has a surface tension from about 25 dynes/centimeter to about 35 dynes/centimeter.

In another specific embodiment, a well treatment compositions includes a gelling composition that includes: one or more base oils, where the one or more base oils are selected from hydrotreated light naphthenic distillates, petroleum, hydrotreated light paraffinic distillates, petroleum, hydrotreated light paraffinic distillates, solvent dewaxed heavy paraffinic distillates, mineral oil, and mixtures thereof, where the one or more base oils are present, and where the gelling composition has a content of the one or more oils from about 30.0%/wt to about 80.0%/wt; one or more rheology additives, where the one or more rheology additives are selected from alkyl quaternary ammonium bentonite organophilic phyllosilicate, sodium-montmorillonite bentonite clay, and mixtures thereof, where the one or more rheology additives are present, and where the gelling composition has a content of the one or more rheology additives from about 1.0%/wt to about 10.0%/wt; one or more surfactant compositions, where the one or more surfactant compositions include: one or more surfactants, where the one or more surfactants include: sodium alpha olefin sulfonate, cocamidopropyl hydroxysultaine, and mixtures thereof, where the one or more surfactants are present, and where the surfactant composition has a content of the one or more surfactants from about 0.1%/wt to about 50.0%/wt; and one or more carrier media, where the one or more carrier media are present, and where the surfactant composition has a content of the one or more carrier media from about 50.0%/wt to about 99.9%/wt, where the surfactant composition as a hydrophilic-lipophilic balance of about 11.0 to about 14.0; and where the surfactant composition has a surface tension from about 25 dynes/centimeter to about 35 dynes/centimeter; one or more organic compounds, where the one or more organic compounds are present, where the one or more organic compounds include propylene carbonate, and where the gelling composition has a content of the propylene carbonates from about 0.1%/wt to about 5.0%/wt; and one or more polymers, where the one or more polymers include: xantham gum, carboxymethyl cellulose, polyanionic cellulose, diutan gum, guar gum, and mixtures thereof, where the one or more polymers are present, and where the gelling composition has a content of the one or more polymers from about 20%/wt to about 70%/wt.

In yet another specific embodiment, a method for treating a subterranean formation includes: injecting a well treatment composition into the subterranean formation, where the well treatment composition includes: a gelling composition, one or more additives, one or more aphrons, and one or more carrier media.

BRIEF DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art can utilize their teachings. Therefore, no limitation of the scope of the present disclosure is thereby intended.

FIG. 2: shows Table 1, which includes examples of surfactant compositions in accordance with the principles of the invention.

FIG. 3: shows Table 4, which includes examples of gelling compositions in accordance with the principles of the invention.

DETAILED DESCRIPTION

Figure 1:
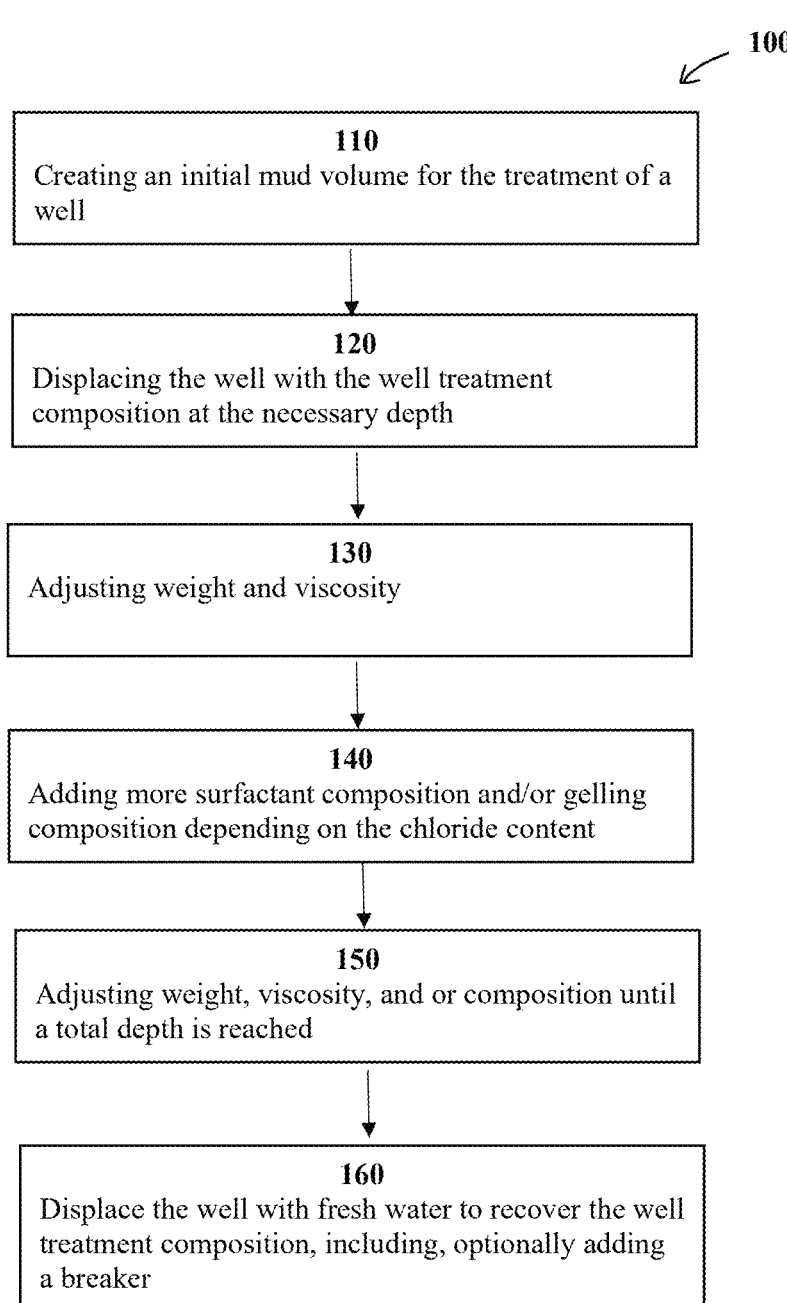
FIG. 1: shows a flow chart of an illustrative process of treating a subterranean formation with compositions as described herein

In one or more embodiments, a surfactant composition can include, but are not limited: one or more surfactants, one or more organic compounds, one or more carrier media, and one or more additives.

In one or more embodiments, a gelling composition can include, but are not limited: one or more surfactants, one or more gelling agents, one or more polymers, one or more organic compounds, one or more weighing materials, one or more carrier media, and one or more additives.

In one or more embodiments, a well treatment composition can include, but is not limited: one or more surfactant compositions, one or more gelling compositions, one or more aphrons, one or more surfactants, one or more gelling agents, one or more polymers, one or more organic compounds, one or more salts, one or more acids, one or more bases, one or more weighing materials, one or more carrier media, and one or more additives, one or more weighting materials, one or more viscosifiers, one or more flocculants, one or more thinners, one or more dispersants, one or more temperature stability agents, one or more lubricants, one or more pH control additives, one or more lost circulation materials, one or more antimicrobial agents, one or more defoamers, one or more corrosion inhibitors, one or more $H_2S$ scavengers, and one or more additives.

In one or more embodiments, the surfactant compositions and/or well treatment compositions can include the one or more aphron compositions, one or more produced oil and gas compositions, and one or more additives. In one or more embodiments, the surfactant compositions can be absent of any the one or more surfactants, one or more polymers, one or more organic compounds, one or more salts, one or more acids, one or more bases, one or more weighing materials, one or more carrier media, and one or more additives, one or more weighting materials, one or more viscosifiers, one or more flocculants, one or more thinners, one or more dispersants, one or more temperature stability agents, one or more lubricants, one or more pH control additives, one or more lost circulation materials, one or more antimicrobial agents, one or more defoamers, one or more corrosion inhibitors, one or more $H_2S$ scavengers, and one or more additives. It should be noted that some of the chemicals listed for the various components of the surfactant compositions and the well treatment compositions may have more than one function in the composition.

In one or more embodiments, a surfactant composition can include, but is not limited to: one or more surfactants, one or more carrier fluids, and one or more additives. In some embodiments, the surfactant composition can be free of the one or more additives.

The one or more surfactants can include, but is not limited to: emulsifying, nonemulsifying, anionic, cationic, nonionic, amphoteric, and mixtures thereof. In some embodiments, the one or more surfactants can include, but is not limited to: one or more alpha olefin sulfonate, one or more hydroxysultaines, and mixtures thereof. In some embodiments, the one or more surfactants can include, but is not limited to one or more of the following: one or more alpha olefin sulfonate, one or more hydroxysultaines, nonylphenol ethoxylated (C13/9 moles EO); ethoxylated alcohol; trideceth-9 (6-10 moles EO); sodium alpha olefin sulfonate (C12-C16); 1-Dodecanesulfonic acid, hydroxy-, sodium salt; lauramine oxide (C12); sodium lauryl ether sulfate (2 moles EO); sodium lauryl sulfate; cocamidopropyl hydroxysultaine (C12); n-octadecyl disodium sulfosuccinate; Dioctyl Sodium Sulfosuccinate; Cocamidopropyl Betaine; Coco Glucoside (C8-C14); Decyl Glucoside (C8-C10); glyceryl laurate; cocamidopropylamine oxide; calcium dodecylbenzenesulphonate; sodium cocoate; lauramidopropyl hydroxysultaine; cocamide diethanolamine; dodecyldimethylamine oxide; polyoxyethylene 20 sorbitan trioleate (20 moles EO); sorbitan monolaurate (20 moles EO); and mixtures thereof. The one or more alpha olefin sulfonate can include, but is not limited to one or more of the following: alpha olefin sulfonate can include carbon chains of varying lengths. For example, the alpha olefin sulfonate can include carbon chain lengths of C8, C9, C10, C11, C12, C13, C14, C15, C16, C17, CIS, and mixtures thereof. In another example, the alpha olefin sulfonate can include sodium alpha olefin sulfonate; dodecane-1-sulfonic acid (C12) CAS 30965-85-6; 1-dodecanesulfonic acid, hydroxy-, sodium salt CAS 128824-30-6; and mixtures thereof. The one or more hydroxysultaines can include, but is not limited to one or more of the following: cocamidopropyl hydroxysultaine (C12) CAS 68139-30-0, and mixtures thereof.

The surfactant composition can have a content of the one or more surfactants that varies widely. For example, the surfactant compositions can have a content of the one or more surfactants from a low of about 0.1%/wt., about 1.0%/wt., or about 5.0%/wt., to a high of about 90.0%/wt., about 95.0%/wt., or about 99.9%/wt. In another example, the surfactant compositions can have a content of the one or more surfactants from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The weight percent of the one or more surfactants in the surfactant composition can be based on the total weight of the surfactant composition, or based on the one or more surfactants and the one or more carrier media, and one or more additives.

The one or more carrier media can include, but is not limited to: one or more solvents, aqueous solutions, water, and mixtures thereof. The one or more solvents can include, but is not limited to: one or more polar protic solvents, one or more polar aprotic solvents, and mixtures thereof. The one or more carrier fluids and/or solvents, can include, but is not limited to: water, 2-propanol, 2-butoxyethanol, hexanes, toluene, methanol, ethanol, propanol, isopropanol, acetone, acetonitrile, chloroform, diethyl ether, methylene chloride, dimethyl formamide, ethylene glycol, propylene glycol, triethylamine, tetrahydrofuran, and mixtures thereof. In an embodiment, the surfactant composition can be free of the one or more carrier fluids and/or solvents. For example, the surfactant composition can be free of alcohol.

The surfactant composition can have a content of the one or more carrier media that varies widely. For example, the surfactant composition can have a content of the one or more carrier media from a low of about 0.1%/wt., about 1.0%/wt., or about 5.0%/wt., to a high of about 90.0%/wt., about 95.0%/wt., or about 99.9%/wt. In another example, the surfactant composition can have a content of the one or more carrier media from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The weight percent of the one or more carrier media in the surfactant composition can be based on the total weight of the surfactant composition, or based on the one or more surfactants, one or more carrier media, and one or more additives.

The one or more additives can include, but is not limited to one or more of the following: one or more acids, one or more bases, one or more salts, one or more weighting materials, one or more viscosifiers, one or more flocculants, one or more thinners, one or more dispersants, one or more temperature stability agents, one or more pH control additives, one or more lost circulation materials, one or more antimicrobial agents, one or more defoamers, one or more corrosion inhibitors, and one or more $H_2S$ scavengers. In an embodiment, the surfactant composition can be free of any one the one or more additives.

The surfactant composition can have a content of the one or more additives that varies widely. For example, the surfactant composition can have a content of the one or more additives from a low of about 0.1%/wt., about 10.0%/wt., or about 20.0%/wt., to a high of about 90.0%/wt., about 95.0%/wt., or about 99.9%/wt. In another example, the surfactant compositions can have a content of the one or more additives from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The weight percent of one or more additives in the surfactant composition can be based on the total weight of the surfactant composition, or based on the one or more surfactants, one or more carrier media, and one or more additives.

The surfactant composition can have a solids content that varies widely. For example, the surfactant composition can have solids content from a low of about 0.1%/wt., about 10.0%/wt., or about 20.0%/wt., to a high of about 90.0%/wt., about 95.0%/wt., or about 99.9%/wt. In other example, the surfactant composition can have a solids content from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the solids content in the surfactant composition can be based on the total weight of the surfactant composition; or based on the one or more surfactants, one or more carrier media, and one or more additives. As used herein, the solids content of the aphron composition, as understood by those skilled in the art, can be measured by determining the weight loss upon heating a small sample, e.g., 1-5 grams of the surfactant composition, to a suitable temperature, e.g., 125° C., and a time sufficient to remove the liquid therefrom.

The surfactant composition can have a viscosity that varies widely. For example, the surfactant composition can have a viscosity from a low of about 10 cP, about 1,000 cP, or about 100,000 cP, to a high of about 250,000 cP, about 900,000 cP, or about 2,500,000 cP. In another example, the surfactant composition can have a viscosity from about 10 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the surfactant composition can be measured on a Brookfield viscosimeter. The viscosity of the surfactant compositions can be measured at various temperatures, such as 25° C., 40° C., 60° C., and 100° C.

The surfactant composition can have a density that varies widely. For example, the surfactant composition can have a density from a low of about 5.0 pounds per gallon (lb/gal), about 7.0 lb/gal, or about 10.0 lb/gal, to a high of about 20.0 lb/gal, 30.0 lb/gal, or about 50.0 lb/gal. In another example, the surfactant composition can have a density from about 5.0 ppg to about 50.0 ppg, about 6.0 ppg to about 15.0 ppg, about 7.0 ppg to about 20.0 ppg, about 8.0 ppg to about 12.0 ppg, about 10.0 ppg to about 30.0 ppg, about 20.0 ppg to about 40.0 ppg, or about 30.0 ppg to about 50.0 ppg.

The surfactant composition can have an emulsifying capacity varies widely. For example, the surfactant composition can have an emulsifying capacity from a low of about 0.01 g/mg, about 0.02 g/mg, or about 0.05 g/mg, to a high of about 0.10 g/mg, about 2.50 g/mg, or about 4.0 g/mg. In another example, the surfactant composition can have an emulsifying capacity from about 0.02 g/mg to about 0.10 g/mg, about 1.00 g/mg to about 2.00 g/mg, or about 1.00 g/mg to about 4.00 g/mg.

The surfactant composition can have an emulsion activity index that varies widely. For example, the surfactant composition can have an emulsion activity index from a low of about 0.01 m²/g, about 0.02 m²/g, or about 0.05 m²/g, to a high of about 0.10 m²/g, about 0.50 m²/g, or about 1.0 m²/g. In another example, the surfactant composition can have an emulsion activity index from about 0.02 m²/g to about 0.10 m²/g, about 0.03 m²/g to about 0.05 m²/g, or about 0.04 m²/g to about 0.1 m²/g.

The surfactant composition can have an emulsion stability varies widely. For example, the surfactant composition can have an emulsion stability from a low of about 5%, about 10%, or about 20%, to a high of about 50%, about 60%, or about 95%. In another example, the surfactant composition can have an emulsion stability from about 5% to about 95%, about 10% to about 35%, about 25% to about 75%, or about 15% to about 30%, The surfactant composition can have a Zeta potential that varies widely. For example, the surfactant composition can have a Zeta potential from a low of about 30 mV, about 40 mv, about 60 my, to a high of about 80, about 90 mv, or about 100 mv. For example, the surfactant composition can have a Zeta potential from about 30 mV to about 100 mV, about 40 mV to about 60 mV, about 50 mV to about 80 mV, or about 60 mV to about 100 mV.

The surfactant composition can have a surface tension that varies widely. For example, the surfactant composition can have a surface tension from a low of about 15 dynes/centimeter, about 20 dynes/centimeter, or about 25 dynes/centimeter, to a high of about 35 dynes/centimeter, about 40 dynes/centimeter, or about 45 dynes/centimeter. In another example, the surfactant composition can have a surface tension from about 15 dynes/centimeter to about 45 dynes/centimeter, about 20 dynes/centimeter to about 30 dynes/centimeter, or about 25 dynes/centimeter to about 35 dynes/centimeter.

The surfactant composition can have a hydrophilic-lipophilic balance (HLB) that varies widely. For example, the surfactant composition can have hydrophilic-lipophilic balance from a low of 0, 1, or 2, to a high of about 18, 19, or 20. In another example, the one or more surfactants can have hydrophilic-lipophilic balance from 1 to 3, 2 to 6, 4 to 10, 5 to 11, 9 to 20, 10 to 15, 11 to 14, 11 to 17, or 12 to 20.

The one or more gelling compositions can include, but is not limited to one or more of the following: one or more surfactant compositions; one or more surfactants; one or more one or more base oils; one or more rheology additives; one or more organic compounds; one or more polymers; and mixtures thereof. In some embodiments, the gelling composition can include, but is not limited to one or more of the following: one or more copolymers; one or more polypropylene glycol; one or more polyacrylamide and carboxymethyl cellulose (CMC), CAS 9004-32-4; diutan CAS 125005-87-0; polyanionic cellulose (PAC), CAS 9004-32-4; xanthan gum, CAS 11138-66-2; guar gum, CAS 9000-30-0; and mixtures thereof. The one or more gelling agents can at least partially gel and suspend the gelling composition.

The gelling composition can have a content of the one or more surfactant compositions that varies widely. For example, the gelling composition can have a content of the one or more surfactant compositions from a low of about 0.1%/wt., about 1.0%/wt., or about 5.0%/wt., to a high of about 90.0%/wt., about 95.0%/wt., or about 99.9%/wt. In another example, the gelling composition can have a content of the one or more surfactant compositions from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the one or more surfactants in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more one or more base oils can include, but is not limited to one or more of the following: one or more base oils; hydrotreated light naphthenic distillates; petroleum, hydrotreated light paraffinic distillates; petroleum, hydrotreated light paraffinic distillates; solvent dewaxed heavy paraffinic distillates; mineral oil; and mixtures thereof.

The gelling composition can have a content of the one or more base oils that varies widely. For example, the gelling composition can have a content of the one or more base oils from a low of about 0.1%/wt., about 1.0%/wt., or about 5.0%/wt., to a high of about 90.0%/wt., about 95.0%/wt., or about 99.9%/wt. In another example, the gelling composition can have a content of the one or more base oils from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the one or more base oils in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more rheology additives can include, but is not limited to one or more of the following: one or more clays; one or more bentonite clays; one or more barites; one or more hematites; one or more calcites; one or more ilmenites; alkyl quaternary ammonium bentonite organophilic phyllosilicate; sodium-montmorillonite bentonite clay; and mixtures thereof.

The gelling composition can have a content of the one or more rheology additives that varies widely. For example, the gelling composition can have a content of the one or more rheology additives from a low of about 0.1%/wt., about 1.0%/wt., or about 5.0%/wt., to a high of about 90.0%/wt., about 95.0%/wt., or about 99.9%/wt. In another example, the gelling composition can have a content of the one or more rheology additives from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the one or more rheology additives in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more surfactants can include, but is not limited to one or more of the following: emulsifying, nonemulsifying, anionic, cationic, nonionic, amphoteric, and mixtures thereof. The one or more surfactants can include, but is not limited to one or more of the following: one or more alpha olefin sulfonate, one or more hydroxysultaines, and mixtures thereof. The one or more alpha olefin sulfonate can include, but is not limited to one or more of the following: alpha olefin sulfonate can include carbon chains of varying lengths. For example, the alpha olefin sulfonate can include carbon chain lengths of C8, C9, C10, C11, C12, C13, C14, C15, C16, C17, C18, and mixtures thereof. In an embodiment, the alpha olefin sulfonate can include sodium alpha olefin sulfonate; dodecane-1-sulfonic acid (C12) CAS 30965-85-6; 1-dodecanesulfonic acid, hydroxy-, sodium salt CAS 128824-30-6; and mixtures thereof. The one or more hydroxysultaines can include, but is not limited to one or more of the following: cocamidopropyl hydroxysultaine (C12) CAS 68139-30-0, and mixtures thereof.

In some embodiments, the surfactant is at least one of a cationic surfactant, an anionic surfactant, and a non-ionic surfactant. In some embodiments, the ionic groups of the surfactant can include counterions, such that the overall charge of the ionic groups is neutral, whereas in other embodiments, no counterion can be present for one or more ionic groups, such that the overall charge of the one or more ionic groups is not neutral.

The surfactant can include a non-ionic surfactant. The non-ionic surfactant can include, but is not limited to one or more of the following: polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant. Examples of suitable non-Ionic surfactants can include, but are not limited to, condensates of ethylene oxide with long chain fatty alcohols or fatty acids such as a ($C_{12-16}$) alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols. In some examples, suitable non-ionic surfactants can include at least one of an alkyl polyglycoside, a sorbitan ester, a methyl glucoside ester, an amine ethoxylate, a diamine ethoxylate, a polyglycerol ester, an alkyl ethoxylate, an alcohol that has been at least one of polypropoxylated and polyethoxylated, any derivative thereof, or any combination thereof.

The anionic surfactant can include, but is not limited to one or more of the following: alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

The cationic surfactants can include, but is not limited to one or more of the following: at least one of an arginine methyl ester, an alkanolamine, an alkylenediamide, an alkyl ester sulfonate, an alkyl ether sulfonate, an alkyl ether sulfate, an alkali metal alkyl sulfate, an alkyl or alkylaryl sulfonate, a sulfosuccinate, an alkyl or alkylaryl disulfonate, an alkyl disulfate, an alcohol polypropoxylated or polyethoxylated sulfates, a taurate, an amine oxide, an alkylamine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, any derivative thereof, and any combination thereof. Examples of suitable cationic surfactants can include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

The gelling composition can have a content of the one or more surfactants that varies widely. For example, the gelling composition can have a content of the one or more surfactants from a low of about 0.1%/wt., about 1.0%/wt., or about 5.0%/wt., to a high of about 90.0%/wt., about 95.0%/wt., or about 99.9%/wt. In another example, the gelling composition can have a content of the one or more surfactants from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the one or more surfactants in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more surfactants can have a hydrophilic-lipophilic balance (HLB) that varies widely. For example, the one or more surfactants can have hydrophilic-lipophilic balance from a low of 0, 1, or 2, to a high of about 18, 19, or 20. In another example, the one or more surfactants can have hydrophilic-lipophilic balance from 1 to 3, 2 to 6, 4 to 10, 5 to 11, 9 to 20, 10 to 15, 11 to 14, 11 to 17, or 12 to 20.

The gelling composition can have a content of the one or more gelling agents that varies widely. For example, the gelling composition can have a content of the one or more gelling agents from a low of about 0.1%/wt., about 1.0%/wt., or about 5.0%/wt., to a high of about 90.0%/wt., about 95.0%/wt., or about 99.9%/wt. In another example, the gelling composition can have a content of the one or more gelling agents from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the gelling compositions can be free of the one or more gelling agents. The percent by weight of the one or more gelling agents in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more polymers can include, but are not limited: one or more polypropylene glycol; one or more polyacrylamide and carboxymethyl cellulose (CMC); hydroxyethyl cellulose (HEC); CAS 9004-32-4; diutan, CAS 125005-87-0; polyanionic cellulose (PAC), CAS 9004-32-4; xanthan gum, CAS 11138-66-2; guar gum, CAS 9000-30-0; diutan gum; nonylphenol ethoxylated; ethoxylated alcohol, trideceth-9; ethylene oxide/propylene oxide copolymer; sodium carboxymethyl cellulose; and mixtures thereof. The surfactant composition can have a content of the one or more polymers that varies widely. For example, the surfactant compositions can have a content of the one or more polymers from a low of about 0.1%/wt., about 1.0%/wt., or about 5.0%/wt., to a high of about 90.0%/wt., about 95.0%/wt., or about 99.9%/wt. In another example, the surfactant compositions can have a content of the one or more polymers from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the surfactant compositions can be free of the one or more polymers. The percent by weight of the one or more polymers in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more polymers can have a weight-average molar mass ($M_w$) that varies widely. For example, the one or more polymers can have a weight-average molar mass from a low of about 300 g/mol, about 3,000 g/mol, or about 10,000 g/mol, to a high of about 80,000 g/mol, about 100,000 g/mol, or about 200,000 g/mol. In another example, the one or more polymers can have a weight-average molecular weight that is less than 8,000 g/mol, less than 5,000 g/mol, or less than 1,000 g/mol. In another example, the one or more polymers can have a weight-average molar mass from about 300 g/mol to about 200,000 g/mol, about 300 g/mol to about 1,200 g/mol, about 1,000 g/mol to about 10,000 g/mol, about 2,000 g/mol to about 50,000 g/mol, about 100,000 g/mol to about 200,000 g/mol. The molar mass of the one or more polymers can be measured by gel permeation chromatography with tri-detectors.

The one or more polymers can have a number-average molar mass ($M_n$) that varies widely. For example, the polypropylene glycol can have a number-average molar mass from a low of about 300 g/mol, about 1,000 g/mol, or about 3,000 g/mol, to a high of about 80,000 g/mol, about 100,000 g/mol, or about 200,000 g/mol. In another example, the one or more polymers can have a number-average molar mass that is less than 500 g/mol, less than 6,000 g/mol, or less than 10,000 g/mol. In another example, the one or more polymers can have a number-average molar mass from about 300 g/mol to about 2,000 g/mol, about 3,000 g/mol to about 20,000 g/mol, about 2,000 g/mol to about 8,000 g/mol, about 40,000 g/mol to about 80,000 g/mol, about 100,000 g/mol to about 200,000 g/mol.

The one or more organic compounds can include, but is not limited to one or more of the following: propylene carbonate, ethylene carbonate, and mixtures thereof.

The gelling composition can have a content of the one or more organic compounds that varies widely. For example, the gelling composition can have a content of the one or more organic compounds from a low of about 0.1%/wt., about 1.0%/wt., or about 5.0%/wt., to a high of about 90.0%/wt., about 95.0%/wt., or about 99.9%/wt. In another example, the gelling composition can have a content of the one or more organic compounds from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/ wt., about 50.0%/wt. to about 60.0%/wt., or about 70.0%/wt. to about 80.0%/wt. In another example, the gelling composition can have a content of the one or more organic compounds from a low of about 5 mols, about 10 mols, or about 15 mols, to a high of about 100 mols, about 500 mols, or about 1,000 mols. In another example, the surfactant compositions can have a content of the one or more organic compounds from about 5 mols to about 1,000 mols, about 8.5 mols to about 10 mols, about 15 mols to about 100 mols, about 100 mols to about 500 mols. In another example, the gelling compositions can be free of the one or more organic compounds. The percent by weight of the one or more organic compounds in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more carrier media can include one or more solvents. The one or more solvents can include, but is not limited to: one or more of the following: one or more polar protic solvents, one or more polar aprotic solvents, and mixtures thereof. The one or more carrier media and/or solvents, can include, but is not limited to one or more of the following: water, hexanes, toluene, methanol, ethanol, propanol, isopropanol, acetone, acetonitrile, chloroform, diethyl ether, methylene chloride, dimethyl formamide, ethylene glycol, propylene glycol, triethylamine, tetrahydrofuran, and mixtures thereof. In an embodiment, the gelling composition can be free of the one or more carrier media and/or solvents. For example, the gelling composition can be free of alcohol.

The gelling composition can have a content of the one or more carrier media that varies widely. For example, the gelling composition can have a content of the one or more carrier media from a low of about 0.1%/wt., about 1.0%/wt., or about 5.0%/wt., to a high of about 90.0%/wt., about 95.0%/wt., or about 99.9%/wt. In another example, the gelling composition can have a content of the one or more carrier media from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The weight percent of the one or more carrier media in the gelling composition can be based on the total weight of the gelling composition; or based on the one or more surfactant compositions, one or more surfactants, one or more base oils, one or more rheology additives, one or more organic compounds, one or more polymers, and one or more additives.

The gelling composition can have a content of the water that varies widely. For example, the gelling composition can have a content of water from a low of about 0.1%/wt., about 1.0%/wt., or about 5.0%/wt., to a high of about 90.0%/wt., about 95.0%/wt., or about 99.9%/wt. In another example, the surfactant composition can have a content of water from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the gelling composition can be free of water. The percent by weight of water in the gelling composition can be based on the total weight of the gelling composition; or based on the one or more surfactant compositions, one or more surfactants, one or more base oils, one or more rheology additives, one or more organic compounds, one or more polymers, and one or more additives.

The one or more additives can include, but is not limited to one or more of the following: one or more acids, one or more bases, one or more salts, one or more weighting materials, one or more viscosifiers, one or more flocculants, one or more thinners, one or more dispersants, one or more temperature stability agents, one or more pH control additives, one or more lost circulation materials, one or more antimicrobial agents, one or more defoamers, one or more corrosion inhibitors, one or more lubricants, and one or more $H_2S$ scavengers. In an embodiment, the gelling composition can be free of any one the one or more additives.

The one or more salts can include, but is not limited to one or more of the following: one or more organic salts, one or more inorganic salts, and mixtures thereof. The one or more organic salts can include, but are not limited: dipotassium glutarate ($C_5H_6K_2O_4$), disodium glutarate ($C_5H_6K_2O_4$), sodium citrate ($Na_3C_6H_5O_7$), potassium citrate ($K_3C_6H_5O_7$), potassium acetate ($CH_3CO_2K$), choline chloride [(($CH_3$)$_3NCH_2CH_2OH$)Cl], sodium acetate ($CH_3CO_2Na$), and mixtures thereof. The one or more organic salts can include, but are not limited: sodium carbonate ($Na_2CO_3$), sodium bicarbonate, ($NaHCO_3$), and mixtures thereof.

The one or more bases can include, but is not limited to one or more of the following: calcium hydroxide [Ca(OH)$_2$], sodium hydroxide (NaOH), potassium hydroxide (KOH), potassium carbonate ($K_2CO_3$) and mixtures thereof.

The one or more acids can include, but is not limited to one or more of the following: hydrochloric acid (HCl), carbonic acid ($H_2CO_3$), sulfuric acid ($H_2SO_4$), formic acid ($CH_2O_2$), citric acid ($C_6H_8O_7$), acetic acid ($C_2H_4O_2$) and mixtures thereof.

The one or more viscosifiers can include, but is not limited to one or more of the following: one or more bentonite clays, one or more attapulgite clays, one or more carboxymethyl celluloses, and mixtures thereof.

The one or more flocculants can include, but is not limited to one or more of the following: inorganic salts, hydrated lime, gypsum, sodium carbonate, sodium bicarbonate, sodium tetraphosphate, polyacrylamide, and mixtures thereof.

The one or more dispersants can include, but is not limited to one or more of the following: one or more tannins, one or more polyphosphates, one or more lignites, one or more lignosulfonates, and mixtures thereof.

The one or more pH control additives can include, but is not limited to one or more of the following: lime ($CaCO_3$), sodium hydroxide (NaOH), sodium carbonate ($Na_2CO_3$), sodium bicarbonate ($NaHCO_3$), hydrochloric acid (HCl), carbonic acid ($H_2CO_3$), sulfuric acid ($H_2SO_4$), formic acid ($CH_2O_2$), citric acid ($C_6H_8O_7$), acetic acid ($C_2H_4O_2$), calcium hydroxide [Ca(OH)$_2$], sodium hydroxide (NaOH), potassium hydroxide (KOH), potassium carbonate ($K_2CO_3$), and mixtures thereof.

The one or more antimicrobial agents (biocides) can include, but is not limited to one or more of the following: glutaraldehyde, dazomet, tetrakis (hydroxymethyl) phosphonium sulfate, 2,2-dibromo-3-nitrilopropionamide, and mixtures thereof.

The one or more defoamers can include, but is not limited to one or more of the following: one or more alcohols, silicones, one or more aluminum stearate, one or more alkyl phosphates, and mixtures thereof.

The one or more $H_2S$ scavengers can include, but is not limited to one or more of the following: monoethanoloamines, monomethylamines, triazines, N-methyldiethanolamine, diisopropyl amine, diglycoamine, glyoxals, and mixtures thereof.

The one or more additives can include, but is not limited to one or more of the following: one or more weighting materials, one or more viscosifiers, one or more thinners, one or more dispersants, one or more temperature stability agents, one or more flocculants, one or more filtrate reducers, one or more pH control additives, one or more lost circulation materials, one or more lubricants, one or more shale control materials, one or more emulsifiers, one or more surfactants, one or more antimicrobial agents, one or more pipe-freeing agents, one or more corrosion inhibitors, one or more scale inhibitors, one or more breakers, one or more proppants, one or more friction reducers, one or more solvents and/or carrier fluid, and mixtures thereof.

The gelling composition can have a content of the one or more additives that varies widely. For example, the gelling composition can have a content of the one or more additives from a low of about 0.1%/wt., about 10.0%/wt., or about 20.0%/wt., to a high of about 90.0%/wt., about 95.0%/wt., or about 99.9%/wt. In another example, the gelling composition can have a content of the one or more additives from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the surfactant composition can be free of the one or more additives. The percent by weight of one or more additives in the gelling composition can be based on the total weight of the gelling compositions.

The well treatment composition can have a solids content that varies widely. For example, the surfactant composition can have solids content from a low of about 0.1%/wt., about 10.0%/wt., or about 20.0%/wt., to a high of about 90.0%/wt., about 95.0%/wt., or about 99.9%/wt. In other example, the gelling composition can have a solids content from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the solids content in the gelling composition can be based on the total weight of the gelling composition.

The gelling composition can have a viscosity that varies widely. For example, the well treatment composition can have a viscosity from a low of about 100 cP, about 1,000 cP, or about 100,000 cP, to a high of about 250,000 cP, about 900,000 cP, or about 2,500,000 cP. In another example, the gelling composition can have a viscosity from about 100 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the gelling composition can be measured on a Brookfield viscosimeter. The viscosity of the gelling composition can be measured at various temperatures, such as 25° C., 40° C., 60° C., and 100° C.

The gelling composition can have a density varies widely. For example, the surfactant composition can have a density from a low of about 5.0 pounds per gallon (lb/gal), about 7.0 lb/gal, or about 10.0 lb/gal, to a high of about 20.0 lb/gal, 30.0 lb/gal, or about 50.0 lb/gal. In another example, the surfactant composition can have a density from about 5.0 lb/gal to about 50.0 lb/gal, about 6.0 lb/gal to about 15.0 lb/gal, about 7.0 lb/gal to about 20.0 lb/gal, about 8.0 lb/gal to about 12.0 lb/gal, about 10.0 lb/gal to about 30.0 lb/gal, about 20.0 lb/gal to about 40.0 lb/gal, or about 30.0 lb/gal to about 50.0 lb/gal.

The gelling composition can have an emulsifying capacity varies widely. For example, the surfactant composition can have an emulsifying capacity from a low of about 0.01 g/mg, about 0.02 g/mg, or about 0.05 g/mg, to a high of about 0.10 g/mg, about 2.50 g/mg, or about 4.0 g/mg. In another example, the surfactant composition can have an emulsifying capacity from about 0.02 g/mg to about 0.10 g/mg, about 1.00 g/mg to about 2.00 g/mg, or about 1.00 g/mg to about 4.00 g/mg.

The gelling composition can have an emulsion activity index that varies widely. For example, the gelling composition can have an emulsion activity index from a low of about 0.01 $m^2$/g, about 0.02 $m^2$/g, or about 0.05 $m^2$/g, to a high of about 0.10 $m^2$/g, about 0.50 $m^2$/g, or about 1.0 $m^2$/g. In another example, the surfactant composition can have an emulsion activity index from about 0.02 $m^2$/g to about 0.10 $m^2$/g, about 0.03 $m^2$/g to about 0.05 $m^2$/g, or about 0.04 $m^2$/g to about 0.1 $m^2$/g.

The gelling composition can have an emulsion stability varies widely. For example, the gelling composition can have an emulsion stability from a low of about 5%, about 10%, or about 20%, to a high of about 50%, about 60%, or about 95%. In another example, the surfactant composition can have an emulsion stability from about 5% to about 95%, about 10% to about 35%, about 25% to about 75%, or about 15% to about 30%, The gelling composition can have a Zeta potential that varies widely. For example, the gelling composition can have a Zeta potential from a low of about 30 mV, about 40 mv, about 60 mv, to a high of about 80, about 90 mv, or about 100 mv. For example, the gelling composition can have a Zeta potential from about 30 mV to about 100 mV, about 40 mV to about 60 mV, about 50 mV to about 80 mV, or about 60 mV to about 100 mV.

In one or more embodiment, the well treatment composition can include, but are not limited: one or more gelling compositions, one or more surfactant compositions, one or more aphrons, one or more surfactants, one or more gelling agents, one or more polymers, one or more organic compounds, one or more salts, one or more acids, one or more bases, one or more weighing materials, one or more carrier media, and one or more additives. one or more weighting materials, one or more viscosifiers, one or more flocculants, one or more thinners, one or more dispersants, one or more temperature stability agents, one or more lubricants, one or more pH control additives, one or more lost circulation materials, one or more antimicrobial agents, one or more defoamers, one or more corrosion inhibitors, one or more $H_2S$ scavengers, and one or more additives. In another embodiments, the well treatment composition can include, but is not limited to one or more of the following: an aphron composition, produced oil and gas from a well, water, and one or more additives. In another embodiment, the aphron treatment composition or the well treatment composition can have their content of their various components modified throughout the well treatment operation.

The aphrons can include one or more gases. The one or more gases can include, but is not limited to: one or more of the following: air, nitrogen, carbon dioxide, or mixtures thereof. In an embodiment, the structure of the aphron can include a gaseous core, one or more layers or shells of carrier media, and one or more layers or shells of the one or more surfactants. For example, the aphron can include a gaseous core surrounded by an inner surfactant shell. The inner surfactant shell can be surrounded by a viscous water shell. The viscous water shell can be surrounded by an outer surfactant shell. The outer surfactant shell can be surrounded by a diffuse electrical double layer. In another embodiment, the structure of the aphron can include a spherical core of air and a protective multilayer film. Unlike conventional an air bubble, which is stabilized by a surfactant monolayer, the outer shell of an aphron can include a more robust surfactant tri-layer. The tri-layer film can include an inner surfactant layer enveloped by a viscous water lamella that is overlaid with a surfactant bilayer that provides rigidity and low permeability to the whole structure.

The well treatment composition can include, but is not limited to one or more of the following: one or more bubbles, one or more microbubbles, and mixtures thereof. The microbubbles of the surfactant composition can have a diameter of that varies widely. For example, the microbubbles of the well treatment composition can have a diameter from a low of about 0.1 μm, about 0.5 μm, or about 1 m, to a high of about 5.0 μm, about 10.0 μm, or about 100.0 μm. In another example, the microbubbles of the surfactant composition can have a diameter from about 0.1 μm to about 100.0 μm, about 0.1 μm to about 5.0 μm, about 0.5 μm to about 5.0 μm, about 0.5 μm to about 10.0 μm, about 0.7 μm to about 15.0 μm, about 5.0 μm to about 15.0 μm, or about 7.0 μm to about 55.0 μm.

The well treatment composition can have percent volume of aphrons that varies widely at atmospheric pressure. For example, the well treatment composition can have percent volume of aphrons at atmospheric pressure from a low of about 2 vol %, about 5 vol %, or about 8 vol %, to a high of about 20 vol %, about 35 vol %, or about 60 vol %. In another example, the well treatment composition can have percent volume of aphrons at atmospheric pressure from about 2 vol % to about 60 vol %, about 4 vol % to about 8 vol %, about 7 vol % to about 12 vol %, about 10 vol % to about 15 vol %, about 12 vol % to about 16 vol %, about 18 vol % to about 25 vol %, about 19 vol % to about 40 vol %, about 20 vol % to about 50 vol %, or about 25 vol % to about 60 vol %.

The well treatment composition can have a content of the one or more surfactant compositions that varies widely. For example, the well treatment composition can have a content of the one or more surfactant compositions from a low of about 0.1%/wt., about 1.0%/wt., or about 5.0%/wt., to a high of about 90.0%/wt., about 95.0%/wt., or about 99.9%/wt. In another example, the well treatment composition can have a content of the one or more surfactant compositions from about 0.1%/wt. to about 99.9%/wt., about 1.0%/wt. to about 3.0%/wt., about 2.0%/wt. to about 3.0%/wt., about 2.0%/wt. to about 5.0%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the one or more surfactant compositions in the well treatment composition can be based on the total weight of the well treatment compositions.

The well treatment composition can have a content of the one or more carrier media that varies widely. For example, the well treatment composition can have a content of the one or more carrier media from a low of about 0.1%/wt., about 1.0%/wt., or about 5.0%/wt., to a high of about 90.0%/wt., about 95.0%/wt., or about 99.9%/wt. In another example, the well treatment composition can have a content of the one or more carrier media from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the well treatment composition can be free of the one or more carrier media. The percent by weight of the one or more carrier media in the well treatment composition can be based on the total weight of the well treatment composition.

The well treatment composition can have a content of the water that varies widely. For example, the well treatment composition can have a content of water from a low of about 0.1%/wt., about 1.0%/wt., or about 5.0%/wt., to a high of about 90.0%/wt., about 95.0%/wt., or about 99.9%/wt. In another example, the surfactant compositions can have a content of water from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the surfactant compositions can be free of water. The percent by weight of water in the well treatment composition can be based on the total weight of the well treatment composition.

The one or more additives for the well treatment composition can include, but is not limited to one or more of the following: one or more surfactants, one or more weighting materials, one or more viscosifiers, one or more flocculants, one or more thinners, one or more dispersants, one or more temperature stability agents, one or more lubricants, one or more pH control additives, one or more lost circulation materials, one or more antimicrobial agents, one or more defoamers, one or more corrosion inhibitors, and one or more $H_2S$ scavengers. In an embodiment, the surfactant composition can be free of any one the one or more additives.

The well treatment composition can have a content of the one or more additives that varies widely. For example, the well treatment composition can have a content of the one or more additives from a low of about 0.1%/wt., about 1.0%/wt., or about 5.0%/wt., to a high of about 90.0%/wt., about 95.0%/wt., or about 99.9%/wt. In another example, well treatment composition can have a content of the one or more additives from about 0.1%/wt. to about 99.9%/wt., about 1.0%/wt. to about 99.0%/wt., about 10.0%/wt. to about 90.0%/wt., about 10.0%/wt., to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. In another example, the well treatment composition can be free of the one or more additives. The percent by weight of one or more additives in the well treatment composition can be based on the total weight of the well treatment composition.

The well treatment composition can have a solids content that varies widely. For example, the well treatment composition can have solids content from a low of about 0.1%/wt., about 10.0%/wt., or about 20.0%/wt., to a high of about 90.0%/wt., about 95.0%/wt., or about 99.9%/wt. In other example, the surfactant composition can have a solids content from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the solids content in the well treatment composition can be based on the total weight of the well treatment composition.

The well treatment composition can have a viscosity that varies widely. For example, the well treatment composition can have a viscosity from a low of about 100 cP, about 1,000 cP, or about 100,000 cP, to a high of about 250,000 cP, about 900,000 cP, or about 2,500,000 cP. In another example, the well treatment composition can have a viscosity from about 100 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the one or more well treatment compositions can be measured on a Brookfield viscosimeter. The viscosity of the one or more mixtures can be measured at various temperatures, such as 25° C., 40° C., 60° C., and 100° C.

The well treatment composition can have a density that varies widely. For example, the well treatment composition can have a density from a low of about 5.0 pounds per gallon (lb/gal), about 7.0 lb/gal, or about 10.0 lb/gal, to a high of about 20.0 lb/gal, 30.0 lb/gal, or about 50.0 lb/gal. In another example, the well treatment composition can have a density from about 5.0 lb/gal to about 50.0 lb/gal, about 6.0 lb/gal to about 15.0 lb/gal, about 7.0 lb/gal to about 20.0 lb/gal, about 8.0 lb/gal to about 12.0 lb/gal, about 10.0 lb/gal to about 30.0 lb/gal, about 20.0 lb/gal to about 40.0 lb/gal, or about 30.0 lb/gal to about 50.0 lb/gal.

In one or more embodiments, a method of making a surfactant composition can include, but is not limited to: charging a mixing vessel with water; mixing; adding surfactant; mixing for 15 minutes; adding more surfactant; ground tote of alcohol/solvent before adding; mixing for at least 60 minutes; checking sample for "fish eyes"; if still present continue to mix for 15-minute intervals until "fish eyes" are not present; taking 1000 mL sample to lab for testing, retaining 500 mL; shipping 500 mL sample to customer; package composition; and combinations thereof.

In one or more embodiments, the method of making a surfactant composition can include, but are not limited to one or more of the following actions: contacting an alpha olefin sulfonate, a hydroxysultaine, and a carrier medium to make a first mixture, where the carrier medium includes water; aerating the first mixture to make an aerated first mixture; contacting the aerated first mixture with a gelling agent composition to make the aphron composition, where the gelling agent composition includes one or more polymers, one or more clays, one or more surfactants, and one or more base oils, and where the well treatment composition includes aphrons. In some embodiments, a method of making a surfactant composition can include one or more mixtures.

In one or more embodiments, a method of making a gelling composition can be prepared by mixing a water dilution of sodium alpha olefin sulfonate (C12) CAS 30965-85-6 and CAS 128824-30-6 with cocamidopropyl hydroxysultaine (C12) CAS 68139-30-0 and aerating to form and stabilize microbubbles. In another embodiment, the aerated mixture can be mixed with carboxymethyl cellulose (CMC) CAS 9004-32-4, polyanionic cellulose (PAC) CAS 9004-32-4, xanthan gum CAS 11138-66-2, and guar gum CAS 9000-30-0 suspended in base oils of naphthenic CAS 64742-53-6 and/or with paraffinic CAS 64742-65-0, organoclay and bentonite clays CAS 68953-58-2, propylene carbonate CAS 108-32-7 (polar activators), nonionic surfactants with a Hydrophilic-Lipophilic Balance (HLB) of 11.0-14.0 and moles of ethylene oxide (EO) 8.5-10.0. In another example, the aerated mixture was mixed with hydroxyethyl cellulose (HEC) CAS 9004-62-0, hydroxypropyl methyl cellulose (HPMC), methyl cellulose (MC) CAS 9004-67-5, dilutant gum CAS 125005-87-0, in conjunction with the current carboxymethyl cellulose (CMC) CAS 9004-32-4, polyanionic cellulose (PAC) CAS 9004-32-4, xanthan gum CAS 11138-66-2 and guar gum CAS 9000-30-0. In another example, the surfactant composition can be prepared by mixing surfactants with a hydrophilic-lipophilic of 11.0-14.0 and ethylene oxide. In some embodiments, a method of making a gelling composition can include one or more mixtures.

The one or more mixtures can be foamed and/or aerated at atmospheric pressure. In another example, the one or more mixtures can be foamed and/or aerated from a low of about 0.1 MPa, about 1.0 MPa, or about 2.0 MPa, to a high of about 10.0 MPa, about 20.0 MPa, or about 30.0 MPa. In another example, the one or more mixtures can be foamed and/or aerated from about 0.1 MPa to about 30 MPa, about 1.0 MPa to about 10 MPa, or about 0.2 MPa to about 5.0 MPa.

The number of the one or more mixtures can vary. For example, the one or more mixtures can include a first mixture, second mixture, third mixture, fourth mixture, fifth mixture and more mixtures. The first mixture, second mixture, third mixture, fourth mixture, fifth mixture and more mixtures can have a solids content that varies widely. For example, the first mixture, second mixture, third mixture, fourth mixture, and more mixtures can have a solids content that varies widely. For example, the first mixture, second mixture, third mixture, fourth mixture, fifth mixture and more mixtures can have solids content from a low of about 0.1%/wt., about 10.0%/wt., or about 20.0%/wt., to a high of about 90.0%/wt., about 95.0%/wt., or about 99.9%/wt. In other example, the first mixture, second mixture, third mixture, fourth mixture, fifth mixture and more mixtures can have a solids content from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the solids content in the surfactant composition can be based on the total weight of the aphron compositions.

The first mixture, second mixture, third mixture, fourth mixture, fifth mixture and more mixtures can have a viscosity that varies widely. For example, the first mixture, second mixture, third mixture, fourth mixture, and more mixtures can have a viscosity from a low of about 100 cP, about 1,000 cP, or about 100,000 cP, to a high of about 250,000 cP, about 900,000 cP, or about 2,500,000 cP. In another example, the first mixture, second mixture, third mixture, fourth mixture, fifth mixture, and more mixtures can have a viscosity from about 100 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the one or more mixtures can be measured on a Brookfield viscosimeter. The viscosity of the one or more mixtures can be measured at various temperatures, such as 25° C., 40° C., 60° C., and 100° C.

The number of the one or more mixtures can vary. For example, the one or more mixtures can include a first mixture, second mixture, third mixture, fourth mixture, fifth mixture and more mixtures. The first mixture, second mixture, third mixture, fourth mixture, fifth mixture and more mixtures can have a solids content that varies widely. For example, the first mixture, second mixture, third mixture, fourth mixture, and more mixtures can have a solids content that varies widely. For example, the first mixture, second mixture, third mixture, fourth mixture, fifth mixture and more mixtures can have solids content from a low of about 0.1%/wt., about 10.0%/wt., or about 20.0%/wt., to a high of about 90.0%/wt., about 95.0%/wt., or about 99.9%/wt. In other example, the first mixture, second mixture, third mixture, fourth mixture, fifth mixture and more mixtures can have a solids content from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the solids content in the surfactant composition can be based on the total weight of the aphron compositions.

The first mixture, second mixture, third mixture, fourth mixture, fifth mixture and more mixtures can have a viscosity that varies widely. For example, the first mixture, second mixture, third mixture, fourth mixture, and more mixtures can have a viscosity from a low of about 10 cP, about 1,000 cP, or about 100,000 cP, to a high of about 250,000 cP, about 900,000 cP, or about 2,500,000 cP. In another example, the first mixture, second mixture, third mixture, fourth mixture, fifth mixture, and more mixtures can have a viscosity from about 10 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the one or more mixtures can be measured on a Brookfield viscosimeter. The viscosity of the one or more mixtures can be measured at various temperatures, such as 25° C., 40° C., 60° C., and 100° C.

The number of the one or more mixtures can vary. For example, the one or more mixtures can include a first mixture, second mixture, third mixture, fourth mixture, fifth mixture and more mixtures. The first mixture, second mixture, third mixture, fourth mixture, fifth mixture and more mixtures can have a solids content that varies widely. For example, the first mixture, second mixture, third mixture, fourth mixture, and more mixtures can have a solids content that varies widely. For example, the first mixture, second mixture, third mixture, fourth mixture, fifth mixture and more mixtures can have solids content from a low of about 0.1%/wt., about 10.0%/wt., or about 20.0%/wt., to a high of about 90.0%/wt., about 95.0%/wt., or about 99.9%/wt. In other example, the first mixture, second mixture, third mixture, fourth mixture, fifth mixture and more mixtures can have a solids content from about 0.1%/wt. to about 99.9%/wt., about 1.0%/wt. to about 99.0%/wt., about 10.0%/wt. to about 90.0%/wt., about 10.0%/wt. to about 20.0%/wt., about 20.0%/wt. to about 30.0%/wt., about 25.0%/wt. to about 75.0%/wt., about 20.0%/wt. to about 80.0%/wt., about 20.0%/wt. to about 30.0%/wt., about 20.0%/wt. to about 60.0%/wt., about 30.0%/wt. to about 40.0%/wt., about 30.0%/wt. to about 70.0%/wt., about 40.0%/wt. to about 60.0%/wt., about 45.0%/wt. to about 55.0%/wt., about 40.0%/wt. to about 50.0%/wt., about 69.0%/wt. to about 75.0%/wt., about 68.0%/wt. to about 82.0%/wt., about 72.0%/wt. to about 86.0%/wt., about 50.0%/wt. to about 73.0%/wt., about 33.0%/wt. to about 48.0%/wt., about 60.0%/wt. to about 70.0%/wt., about 71.0%/wt. to about 81.0%/wt., about 20.0%/wt. to 30.0%/wt., about 50.0%/wt. to about 60.0%/wt., or about 70.0%/wt. to about 80.0%/wt. The percent by weight of the solids content in the surfactant composition can be based on the total weight of the aphron compositions.

The first mixture, second mixture, third mixture, fourth mixture, fifth mixture and more mixtures can have a viscosity that varies widely. For example, the first mixture, second mixture, third mixture, fourth mixture, and more mixtures can have a viscosity from a low of about 100 cP, about 1,000 cP, or about 100,000 cP, to a high of about 250,000 cP, about 900,000 cP, or about 2,500,000 cP. In another example, the first mixture, second mixture, third mixture, fourth mixture, fifth mixture, and more mixtures can have a viscosity from about 100 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the one or more mixtures can be measured on a Brookfield viscosimeter. The viscosity of the one or more mixtures can be measured at various temperatures, such as 25° C., 40° C., 60° C., and 100° C.

Illustrative examples of well treatment methods are provided herein without being limiting in nature. One having skill in the art would recognize that different subterranean formations may and likely would have differing properties and characteristics that would require the method to be adapted. For example, wells may exemplify differing pressures, mud weight requirements, chloride contents, etc. Furthermore, the location of the well and the availability of resources may dictate how and where compositions for well treatment may be produced. It is readily understood that in some embodiments, one or more of the compositions used in well treatment may be formed off-site, on-site, or both off-site and on-site. Likewise, one or more of the compositions may be created in batches or they may be made "on the fly" which refers to the creation of the compositions in relatively close time proximity to the use thereof for treatment.

The well treatment compositions can be used in well drilling fluids (such as drilling mud), or well completion fluids. In one or more embodiments, the method of treating a subterranean formation can include, but is not limited to: making a surfactant composition and injecting the surfactant composition into the subterranean formation. In another embodiment, the surfactant compositions can be used in oil-based well treatment compositions, synthetic oil-based well treatment compositions, and water-based well treatment compositions. In another embodiment, the method of treating a subterranean formation can include, but is not limited to: making an aphron composition, contacting the surfactant composition with oil and gas produced from the subterranean formation to make a well treatment composition; and injecting the well treatment composition into the subterranean formation. The surfactant compositions can be used in oil-based well treatment fluids, synthetic-based well treatment fluids, and water-based well treatment fluids. In one or more embodiments, the method of using the surfactant compositions can include, but is not limited to: injecting a surfactant composition down a wellbore. In another embodiment, the aphron treatment composition or the well treatment composition can form temporary plugs the perforations in the subterranean formation. In another embodiment, the plugs created by the well treatment composition can at least partially remain in place during the well treatment operation.

Turning to FIG. 3, a non-limiting example is presented of one such method 100 for using the well treatment composition in a drilling mud to treat a subterranean formation or well. For the purposes of this illustrative example, obvious steps may be omitted. For example, it is assumed that a person having ordinary skill in the art would recognize that the compositions (or the components of the compositions) must be delivered to the well-site so that they can be used to treat the well. Likewise, the illustrative example is provided in a simplistic manner with a sequential flow of steps. One having ordinary skill in the art would readily recognize that two or more of these steps may occur concurrently or throughout the drilling process or may not occur at all depending on the particular operation occurring.

As depicted, the process generally begins with 110 creating an initial mud volume for the treatment of the well. The volume of mud to be created may be specific to the particular well, how the well is to be treated, and how the composition/mud is to be created. As previously indicated, the drilling fluid or mud can be formed in batches (either on site or transported to the site) or can be produced as-needed "on the fly" or a combination thereof. Mud is typically formed in mud tanks (or cisterns or mud pits) located in proximity to the well. Additives are typically mixed into the mud tanks, and water is typically provided from nearby reservoirs, although produced water and tanks can be used. Additives are typically chosen to cause the mud to have certain attributes selected from one or more of pH, weight, viscosity or other characteristics. Mud weight is the density of the drilling fluid and is normally measured in pounds per gallon. Mud weight can be measured using a mud scale or mud balance. Viscosity may be measured by a Marsh funnel or other tools known in the art. For the illustrative example, the Surfactant Composition may be added to the mud to lighten the mud to have a viscosity of 40-42 cP and a weight of 7.0-7.5 lb/gal. These numbers can and should be modified to match the requirements of the particular well or subterranean formation. Depending on the application, several hundreds or even thousands of barrels of mud may be required. For example, in some embodiments, the user may batch between 1000-1500 bbls to start. When appropriate equipment is available, the application may not create any batches and instead utilize only on the fly formation.

In some embodiments, with the initial mud and/or well treatment composition formed to desired specifications, the mud and/or well treatment composition can be pumped downhole 120 and the user can begin displacing the well with the well treatment composition at the necessary depth. The mud and/or well treatment composition weight can control the pressure of the well. With appropriate pressure, the pressure of mud and/or well treatment composition weight equalizes the pressure of the formation so that formation fluids cannot enter the wellbore. The user can monitor wellhead and circulating pressures during and at completion of displacement. In some embodiments, weight adjustments may be based on wellhead pressure and returns. Throughout the drill out process, frequent mud checks can be conducted to ensure the well treatment composition is maintained and reconditioned to the specific well needs. The weight and viscosity will be adjusted 130 accordingly after the mud checks. The user may monitor other components and characteristics of the well and/or the mud other than pressure(s), weight, and viscosity. For example, the user may also check sand and chloride content to determine if intervention may be desirable. In at least one embodiment, there can be chlorides and sand content testing conducted on the fluid at regular intervals, such as a minimum of once an hour throughout the job to ensure the fluid properties are in the correct ranges that will allow the chemicals to activate and bond with the fluid. This intervention may be in the form of adding a booster to assist in the functionality of the additives if the chloride content exceeds a predetermined threshold. For example, the user may add a booster of a surfactant composition or gelling composition 140 in the event that the chloride content exceeds about 10,000, about 15,000, about 20,000, about 25,000, about 30,000 (each measured in mg/L), or greater. In some embodiments, the mud weight and/or density may change. These processes will continue until total depth is achieved 150. After total depth is achieved, it is recommended to do a bottoms-up cycle to ensure the well is clean. To do so, the user will displace the well with fresh water 160 to recover the well treatment composition for later use if desired. After the mud is displaced with fresh water, a breaker may be added if desired. A suitable breaker may include ammonia persulfate. Before pulling out of the hole and flushing with fresh water. Ammonia Persulfate (Oxidizer) mix will be spotted in the curve to prevent further growth of bacteria. The lightener fluid that is displaced out of the well can be stored and used at a later date if the proper measurements are taken. The well treatment composition may need to be circulated such as with a transfer pump periodically. This may be at least once every 12 hours of more. The mud may be circulated for a sufficient period of time each circulation, which may include at least 2 hours each time. In some embodiments, a drilling surfactant (foamer) can be added at the start of the well treatment method. In some embodiments, a drilling surfactant (foamer) is not added at the start of the well treatment method.

In one or more embodiment. fluid properties are monitored during the wells, if the fluids chlorides start to rise above 20,000 mg/L, the formula can be adjusted and begin dosing the drilling surfactant accordingly to help strengthen and stabilize the micro-bubbles.

The viscosity and/or weight of the mud may change during operation when using these compositions. For example, the mud may be pumped at 7 ppgs, but return at 7.5 ppgs. It is also feasible that the density of the mud may change when sent downhole. The change in density may be caused at least in part by one or more of the air, bubble, or aphron content generated. The change in density may be between 0-60%, 10-50%, 20-40% or about 30% (or any number within the foregoing range). As such, the mud may need to be reconstituted to the appropriate weight and viscosity. Additional additives may need to be added to reduce the weight or modify the viscosity. In some embodiments, water can be added to reduce the viscosity of the compositions. Likewise, if the mud weight drops below a threshold, such as 6.5 or 6 ppg, a positive displacement pump may be used to increase the weight. If the pH needs to be raised, a base such as sodium bicarbonate may be added. If the pH needs to be lowered, an acid such as acetic acid may be used. In some embodiments, these are mixed with water and then mixed into the mud.

In some embodiments, a surfactant composition, gelling composition, or well treatment composition can be injected into the well at pump pressures that vary widely. For example, the well treatment composition can be injected into the well at pump pressures from a low of about 700 pounds per square inch (psi), about 900 psi, or about 1,200 psi, to a high of about 1500 psi, about 3200 psi, or about 4,000 psi. In another example, the well treatment composition can be injected into the well at pump pressures from about 700 psi to about 4,000 psi, about 700 psi to about 1,500 psi, or about 800 psi to about 2,000 psi.

In some embodiments, a surfactant composition, gelling composition, or well treatment composition can be injected into the well at flow rates that vary widely. For example, the well treatment composition can be injected into the well at flow rates from a low of about 400 gallons per minute (gpm), about 500 gpm, or about 600 psi, to a high of about 900 gpm, about 1,000 gpm, or about 2,000 gpm. In another example, the well treatment composition can be injected into the well at flow rates from a from about 400 gpm to about 2,000 gpm, about 500 gpm to about 1,000 gpm, or about 600 gpm to about 800 gpm.

In some embodiments, a surfactant composition, gelling composition, or well treatment composition can be made one or more reaction mixtures. In some embodiments, a pH of the first reaction mixture, second reaction mixture, third mixture, fourth mixture and more mixtures can have a pH vary widely. For example, the first reaction mixture, second reaction mixture, third mixture, fourth mixture and more mixtures can have a pH from a low of about 0.1, about 1.0, about 2.0, to a high of about 12.0, about 13.0 or about 14.0. In another example, the first reaction mixture, second reaction mixture, third mixture, fourth mixture and more mixtures can have a pH from about 0.1 to about 13.9, about 4.0 to about 12.0, about 5.0 to about 10.0, about 7.5 to about 11.0, about 7.0 to about 10.0, about 8.0 to about 9.0, about 9.0 to about 10.0, about 8.0 to about 10.0, about 9.0 to about 11.0, or about 6.0 to about 9.0.

The pH of the well treatment composition can have a pH vary widely. For example, the surfactant composition and well treatment composition can have a pH from a low of about 0.1, about 1.0, about 2.0, to a high of about 12.0, about 13.0 or about 14.0. In another example, the first reaction mixture, second reaction mixture, third mixture, fourth mixture and more mixtures can have a pH from about 0.1 to about 13.9, about 4.0 to about 12.0, about 5.0 to about 10.0, about 7.5 to about 11.0, about 7.0 to about 10.0, about 8.0 to about 9.0, about 9.0 to about 10.0, about 8.0 to about 10.0, about 9.0 to about 11.0, or about 6.0 to about 9.0.

Examples

To provide a better understanding of the foregoing discussion, the following non-limiting examples are offered. Although the examples can be directed to specific embodiments, they are not to be viewed as limiting the invention in any specific respect.

FIG. 2 shows Tables 1, which include inventive examples of the surfactant composition. Table 2 shows the experiment conditions for making inventive examples of the surfactant composition.

TABLE 2

Experimental Conditions for Making Surfactant Compositions

Personal Protection Equipment (PPE):
Nitrile gloves and Safety glasses
Apron, Safety Glasses, Face Shield, Nitrile gloves,
tyvek sleeves (for sensitive skin)
Mixing Vessel and Equipment:
Poly or Stainless Steel mixing vessel
Hydrofoil or paddle blades
Rubber, Teflon or Viton fittings
diaphragm or centrifical pumps
Hoses
Bung wrenches
Forklift

| Raw Material (Supplier)-Potential Hazard Raw Material Code-%/wt-Density (lbs/gal) | | | | Method of Production |
|---|---|---|---|---|
| water 0.00 | Liquid | Irritant 8.35 | 1 | Ensure equipment is clean. Charge mixing vessel with water, start mixer. |
| surfactant tote | Liquid | Irritant 8.45 | 2 | Add surfactant. Slight exothermic reaction. Mix for 15 minutes. |
| surfactant tote | Liquid | Irritant 8.34 | 3 | Add surfactant. |
| surfactant tote | Liquid | Irritant 8.09 | 4 | Add surfactant. |
| surfactant drum | Liquid | Irritant 8.68 | 5 | Add surfactant. |
| surfactant tote | Liquid | Irritant 8.68 | 6 | Add surfactant. |
| surfactant tote | Liquid | Irritant | 7 | Add surfactant. |
| alcohol/solvent | Liquid | FLAMMAB | 8 | Ground tote of alcohol/solvent before adding. Mix for at least 60 minutes. Check sample for "fish eyes". If still present continue to mix for 15 minute intervals until "fish eyes" are not present. |

TABLE 2-continued

Experimental Conditions for Making Surfactant Compositions

| | | |
|---|---|---|
| 9 | Take 1000 mL sample to Lab for approval, retain 500 mL and ship 500 mL sample to customer (if requested) | |
| 10 | Once QC approves, turn off mixer and begin to package. | |

Quality Control (QC) Specifications:

| | |
|---|---|
| Appearance (visual): | clear light yellow to amber liquid |
| Density (lbs/gal @ 25° C.): | 8.21-8.64 |
| pH (neat @ 78° F./ 25° C.): | 6.00-9.00 |
| Viscosity (cP FANN 35 R1B1 @ 300 rpm): | 8-100 |

Table 3 shows the quality control for making inventive examples of the surfactant composition.

TABLE 3

Scope and Application:

These methods are to be used when determining Quality Control (QC) specifications.

Safety Considerations:

Ensure adequate ventilation. Safety glasses are to be worn at all times while working in the laboratory.

TABLE 3-continued

Method Interference:

Temperature and calibration of equipment has a significant effect on sample results. Therefore, temperature and calibration guidelines set forth shall be strictly adhered too.

Appearance (visual):

1 Pour sample into a clean 250 mL glass graduated beaker
2 Bring sample to ambient (room temperature)
3 Hold 250 mL glass graduated beaker up to the light
4 Based on previous samples and knowledge determine the visual appearance of sample
5 Record results

Density (lbs/gal @ 25° C.):

1 Take a 100 mL TC graduated cylinder, place on a digital balance (0.01 g) and tare weight
2 Bring sample temperature specified
3 Pour sample into 100 mL TC graduated cylinder while at eye level to the 100 mL mark
4 Ensure bottom of meniscus is at the 100 mL marker and no visable air entrapment
5 Take the number on the digital balance and multiply by 8.345
6 Record results based on significant numbers required pH (neat @ 78° F./25° C.):

1 Bring sample to 25° C. (77° F.)
2 Fill a tall form graduated beaker with 300 mL of sample
3 Select the proper spindle and speed on Brookfield
4 Start viscometer reading
5 Let reading stabilize (1 to 3 minutes)
6 Record results

Viscosity (cP FANN 35 R1B1 @ 300 rpm);

1 Bring sample to 25° C. (77° F.)
2 Fill viscometer cup to engraved line (~250 mL)
3 Turn Fann (#1 spring R1B1) on at 300 rpm
4 Slide viscometer cup up to the engraved line on the Bob sleeve (jacket)
5 Let reading stabilize (1 to 3 minutes)
6 Record results FIG. 3 shows Tables 4, which include inventive examples of the gelling composition. Table 5 shows the experiment conditions for making inventive examples of the gelling composition.

TABLE 5

Experimental Conditions for Making Surfactant Compositions

| Raw Material (Supplier)-Potential Hazard Raw Material Code-%/wt-Density (lbs/gal) | | | | Method of Production |
|---|---|---|---|---|
| HH60 base oil tote | Liquid | Irritant 7.40 | 1 | Ensure equipment is clean and water free. Charge mixing vessel with base oil. Start mixer and Venturi pump. |
| Claytone 3 50 lb bag | Powder | Dust Irritant 0.00 | 2 | Add clay into the hopper. Do not allow the powder to clump. Recirc for at least 10 minutes. Mix until completely dispersed, no clumps. |
| QMUL Gel/Claytone II 50 lbs bag | Powder | Dust Irritant 0.00 | 3 | Add propylene carbonate, mix until material turns slightly opaque in appearance and thickens which indicates activation. Time varies based on batch size. |
| propylene carbonate tote | Liquid | Irritant 10.00 | 4 | Add surfactant, material will thin in viscosity. Start high shear pump and recirc for at least 10 minutes. |
| NP-9 tote | Liquid | Irritant 8.55 | 5 | Add PAC HV into the super sack hopper. Mix until completely dispersed, no clumps. |
| PAC HV 2200 lb sack | Powder | Dust Irritant 0.00 | 6 | Add xanthan gum into the super sack hopper. Do not allow the powder to clump. Mix until completely dispersed, no clumps. |

TABLE 5-continued

| Experimental Conditions for Making Surfactant Compositions | | | | |
|---|---|---|---|---|
| xanthan gum | Powder | Dust Irritant | 7 | Add guar gum into the super sack hopper. Do not allow the powder to clump. Mix until completely dispersed, no clumps. Start high shear pump and recirc for at least 30-60 minutes. |
| guar gum | Powder | Dust Irritant | 8 | Take 1000 mL sample to Lab for approval, retain 500 mL and ship 500 mL sample to customer |
| | | | 9 | Once QC approves, turn off high shear pump and mixer. Begin to package. |

Quality Control (QC) Specifications:

Appearance (visual):
Density (lbs/gal @ 25° C.):
Viscosity (cP FANN 35 @ 60 rpm):
Solids (%):

Table 6 shows the quality control for making inventive examples of the gelling composition.

TABLE 6

| Method Interference: |
|---|
| Temperature and calibration of equipment has a significant effect on sample results. Therefore, temperature and calibration guidelines set forth shall be strictly adhered too. |

Appearance (visual):

1 Pour sample into a clean 250 mL glass graduated beaker
2 Bring sample to ambient (room temperature)
3 Hold 250 mL glass graduated beaker up to the light
4 Based on previous samples and knowledge determine the visual appearance of sample
5 Record results Density (lbs/gal @ 25° C.):

1 Take a 100 mL TC graduated cylinder, place on a digital balance (0.01 g) and tare weight
2 Bring sample temperature specified
3 Pour sample into 100 mL TC graduated cylinder while at eye level to the 100 mL mark
4 Ensure bottom of meniscus is at the 100 mL marker and no visable air entrapment
5 Take the number on the digital balance and multiply by 8.344
6 Record results based on significant numbers required Viscosity (cP FANN 35 @ 60 rpm):

1 Bring sample to 25° C. (77° F.)
2 Fill viscometer cup to engraved line (~250 mL)
3 Turn Fann (#1 spring) on at 300 rpm
4 Slide viscometer cup up to the engraved line on the Bob sleeve (jacket)
5 Let reading stabilize (1 to 3 minutes)
6 Record results A gelling composition was prepared by mixing a water dilution of sodium alpha olefin sulfonate (C12) CAS 30965-85-6 and CAS 128824-30-6 with cocamidopropyl hydroxysultaine (C12) CAS 68139-30-0 and aerating to form and stabilize microbubbles. To the aerated mixture carboxymethyl cellulose (CMC) CAS 9004-32-4, polyanionic cellulose (PAC) CAS 9004-32-4, xanthan gum CAS 11138-66-2, and guar gum CAS 9000-30-0 suspended in base oils of naphthenic CAS 64742-53-6 and/or with paraffinic CAS 64742-65-0, organoclay and bentonite clays CAS 68953-58-2, propylene carbonate CAS 108-32-7 (polar activators), nonionic surfactants with a Hydrophilic-Lipophilic Balance (HLB) of 11.0-14.0 and moles of ethylene oxide (EO) 8.5-10.0. In another example, the aerated mixture was mixed with hydroxyethyl cellulose (HEC) CAS 9004-62-0, hydroxypropyl methyl cellulose (HPMC), methyl cellulose (MC) CAS 9004-67-5, diutan gum CAS 125005-87-0, in conjunction with the current carboxymethyl cellulose (CMC) CAS 9004-32-4, polyanionic cellulose (PAC) CAS 9004-32-4, xanthan gum CAS 11138-66-2 and guar gum CAS 9000-30-0. In another example, the surfactant composition was prepared by mixing surfactants with a hydrophilic-lipophilic of 11.0-14.0 and ethylene oxide.

One of ordinary skill in the art will readily appreciate that alternative but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits may be the values from the examples. Certain lower limits, upper limits and ranges appear in at least one claims below. All numerical values are "about" or "approximately" the indicated value, and consider experimental error and variations that would be expected by a person having ordinary skill in the art.

What is claimed is:
1. A well treatment composition, wherein the well treatment composition comprises:
a gelling composition, wherein the gelling composition comprises: one or more base oils, wherein the one or more base oils are selected from hydrotreated light naphthenic distillates, petroleum, hydrotreated light paraffinic distillates, hydrotreated light paraffinic distillates, solvent dewaxed heavy paraffinic distillates, mineral oil, and mixtures thereof, and wherein the gelling composition has a content of the one or more base oils from about 20.0%/wt to about 78.8%/wt; one or more rheology additives, wherein the one or more rheology additives are selected from alkyl quaternary ammonium bentonite organophilic phyllosilicate, sodium-montmorillonite bentonite clay, and mixtures thereof, and wherein the gelling composition has a content of the one or more rheology additives from about 1.0%/wt to about 10.0%/wt; one or more surfactant compositions, wherein the one or more surfactant composition comprises: one or more surfactants, wherein the one or more surfactants comprises: sodium alpha olefin sulfonate, cocamidopropyl hydroxysultaine, and mixtures thereof, and wherein the surfactant composition has a content of the one or more surfactants from about 0.1%/wt to about 50.0%/wt; and one or more carrier media, and wherein the surfactant composition has a content of the one or more carrier media from about 50.0%/wt to about 99.9%/wt, wherein the surfactant composition has a hydrophilic-lipophilic balance of about 11.0 to about 14.0; and wherein the surfactant composition has a surface tension from about 25 dynes/centimeter to about 35 dynes/centimeter; one or more organic compounds, wherein the one or more organic compounds comprises propylene carbonate, and wherein the gelling composition has a content of the propylene carbonates from about 0.1%/wt to about 5.0%/wt; and one or more polymers, wherein the one or more polymers comprise: xantham gum, carboxymethyl cellulose, polyanionic cellulose, diutan gum, guar gum, and mixtures thereof, and wherein the gelling composition has a content of the one or more polymers from about 20%/wt to about 70%/wt;

one or more aphrons;

one or more additives; and one or more well treatment carrier media, wherein the one or more well treatment carrier media comprises water, and wherein the well treatment composition has a content of the one or more well treatment carrier media from about 0.1%/wt to about 99.9%/wt.

2. The well treatment composition of claim 1 further comprising a second surfactant composition, wherein the second surfactant composition comprises:

one or more second surfactants, wherein the one or more second surfactants comprises: sodium alpha olefin sulfonate, cocamidopropyl hydroxysultaine, and mixtures thereof, and wherein the second surfactant composition has a content of the one or more second surfactants from about 0.1%/wt to about 50.0%/wt; and one or more second surfactant carrier media, and wherein the second surfactant composition has a content of the one or more second surfactant carrier media from about 50.0%/wt to about 99.9%/wt, wherein the second surfactant composition as a hydrophilic-lipophilic balance of about 11.0 to about 14.0; and wherein the second surfactant composition has a surface tension from about 25 dynes/centimeter to about 35 dynes/centimeter.

3. The well treatment composition of claim 1, wherein the surfactant composition has density from about 8.21 lbs/gal to about 8.64 lbs/gal.

4. The well treatment composition of claim 1, wherein the surfactant composition has viscosity from about 10 cP to about 2,500,000 cP.

5. A method for making a well treatment composition, wherein the method comprises:

making a first surfactant composition, wherein the first surfactant composition comprises:

one or more first surfactants, wherein the one or more first surfactants comprises:

sodium alpha olefin sulfonate, cocamidopropyl hydroxysultaine, and mixtures thereof, and wherein the first surfactant composition has a content of the one or more first surfactants from about 0.1%/wt to about 99.9%/wt; and one or more first surfactant carrier media, and wherein the first surfactant composition has a content of the one or more first surfactant carrier media from about 0.1%/wt to about 99.9%/wt, wherein the first surfactant composition has a hydrophilic-lipophilic balance of about 11.0 to about 14.0; and wherein the first surfactant composition has a surface tension from about 25 dynes/centimeter to about 35 dynes/centimeter;

making a gelling composition, wherein the gelling composition comprises:

one or more base oils, wherein the one or more base oils are selected from hydrotreated light naphthenic distillates, petroleum, hydrotreated light paraffinic distillates, hydrotreated light paraffinic distillates, solvent dewaxed heavy paraffinic distillates, mineral oil, and mixtures thereof, and wherein the gelling composition has a content of the one or more base oils from about 20.0%/wt to about 78.8%/wt;

one or more rheology additives, wherein the one or more rheology additives are selected from alkyl quaternary ammonium bentonite organophilic phyllosilicate, sodium-montmorillonite bentonite clay, and mixtures thereof, and wherein the gelling composition has a content of the one or more rheology additives from about 1.0%/wt to about 10.0%/wt;

one or more surfactant compositions, wherein the one or more surfactant composition comprises: one or more surfactants, wherein the one or more surfactants comprises: sodium alpha olefin sulfonate, cocamidopropyl hydroxysultaine, and mixtures thereof, and wherein the surfactant composition has a content of the one or more surfactants from about 0.1%/wt to about 50.0%/wt; and one or more surfactant carrier media, and wherein the surfactant composition has a content of the one or more surfactant carrier media from about 50.0%/wt to about 99.9%/wt, wherein the surfactant composition has a hydrophilic-lipophilic balance of about 11.0 to about 14.0; and wherein the surfactant composition has a surface tension from about 25 dynes/centimeter to about 35 dynes/centimeter;

one or more organic compounds, wherein the one or more organic compounds comprises propylene carbonate, and wherein the gelling composition has a content of the propylene carbonates from about 0.1%/wt to about 5.0%/wt; and one or more polymers, wherein the one or more polymers comprise: xantham gum, carboxymethyl cellulose, polyanionic cellulose, diutan gum, guar gum, and mixtures thereof, and wherein the gelling composition has a content of the one or more polymers from about 20%/wt to about 70%/wt; one or more carrier media, wherein the one or more carrier media comprises water, and wherein the well treatment composition has a content of the one or more carrier media from about 0.1%/wt to about 99.9%/wt;

contacting the first surfactant composition and the gelling composition to make a well treatment composition, wherein the well treatment composition has a density from about 8.21 lbs/gal to about 8.64 lbs/gal, and wherein the well treatment composition has a viscosity from about 10 cP to about 2,500,000 cP.

6. A method for treating a subterranean formation, wherein the method of treating a subterranean formation comprises:

injecting a well treatment composition into the subterranean formation, wherein the well treatment composition comprises:

a gelling composition, wherein the gelling composition comprises:

one or more base oils, wherein the one or more base oils are selected from hydrotreated light naphthenic distillates, petroleum, hydrotreated light paraffinic distillates, hydrotreated light paraffinic distillates, solvent dewaxed heavy paraffinic distillates, mineral oil, and mixtures thereof, and wherein the gelling composition has a content of the one or more base oils from about 20.0%/wt to about 78.8%/wt;

one or more rheology additives, wherein the one or more rheology additives are selected from alkyl quaternary ammonium bentonite organophilic phyllosilicate, sodium-montmorillonite bentonite clay, and mixtures thereof, and wherein the gelling composition has a content of the one or more rheology additives from about 1.0%/wt to about 10.0%/wt;

one or more surfactant compositions, wherein the one or more surfactant composition comprises:

one or more surfactants, wherein the one or more surfactants comprises: sodium alpha olefin sulfonate, cocamidopropyl hydroxysultaine, and mixtures thereof, and wherein the surfactant composition has a content of the one or more surfactants from about 0.1%/wt to about 50.0%/wt; and one or more surfactant carrier media, and wherein the surfactant composition has a content of the one or more surfactant carrier media from about 50.0%/wt to about 99.9%/wt, wherein the surfactant composition has a hydrophilic-lipophilic balance of about 11.0 to about 14.0; and wherein the surfactant composition has a surface tension from about 25 dynes/centimeter to about 35 dynes/centimeter;

one or more organic compounds, wherein the one or more organic compounds comprises propylene carbonate, and wherein the gelling composition has a content of the propylene carbonates from about 0.1%/wt to about 5.0%/wt; and one or more polymers, wherein the one or more polymers comprise: xantham gum, carboxymethyl cellulose, polyanionic cellulose, diutan gum, guar gum, and mixtures thereof, and wherein the gelling composition has a content of the one or more polymers from about 20%/wt to about 70%/wt;

one or more carrier media, wherein the one or more carrier media comprises water, and wherein the well treatment composition has a content of the one or more carrier media from about 0.1%/wt to about 99.9%/wt;

one or more aphrons; and one or more additives.

7. The method for treating a subterranean formation of claim 6, wherein the well treatment composition has viscosity from about 10 cP to about 2,500,000 cP.

8. The method for treating a subterranean formation of claim 7 further comprising:

collecting a sample of the well treatment composition on its return from downhole; and testing the well treatment composition for a chloride content, a pH, a density, and a hardness.

9. The method for treating a subterranean formation of claim 8 further comprising:

adding a second surfactant composition to the well treatment composition, wherein the second surfactant composition comprises:

one or more second surfactants, wherein the one or more second surfactants comprises: one or more nonionic surfactants, and wherein the second surfactant composition has a content of the one or more second surfactants from about 0.1%/wt to about 99.9%/wt; and one or more second surfactant carrier media, and wherein the second surfactant composition has a content of the one or more second surfactant carrier media from about 0.1%/wt to about 99.9%/wt, wherein the surfactant composition has a hydrophilic-lipophilic balance of about 11.0 to about 14.0; and wherein the surfactant composition has a surface tension from about 25 dynes/centimeter to about 35 dynes/centimeter.

\* \* \* \* \*